(12) United States Patent
Zhu

(10) Patent No.: US 11,349,369 B2
(45) Date of Patent: May 31, 2022

(54) NON-CONTACT OVERHEAD WATERPROOF STRUCTURE FOR HIGH-SPEED MOTOR

(71) Applicant: SUZHOU INDUSTRIAL PARK XINGDESHENG MOTOR CO., LTD., Jiangsu (CN)

(72) Inventor: Yunfang Zhu, Jiangsu (CN)

(73) Assignee: CINDERSON TECH (SUZHOU) CO., LTD, Suzhou (CN)

( * ) Notice: Subject to any disclaimer, the term of this patent is extended or adjusted under 35 U.S.C. 154(b) by 0 days.

(21) Appl. No.: 17/357,039

(22) Filed: Jun. 24, 2021

(65) Prior Publication Data

US 2021/0344248 A1 Nov. 4, 2021

Related U.S. Application Data

(63) Continuation of application No. PCT/CN2019/119669, filed on Nov. 20, 2019.

(30) Foreign Application Priority Data

Dec. 24, 2018 (CN) .......................... 201811585697.8
Dec. 24, 2018 (CN) .......................... 201822177986.6

(51) Int. Cl.
   *H02K 5/10* (2006.01)
   *H02K 5/124* (2006.01)
   *H02K 5/173* (2006.01)
   *H02K 7/14* (2006.01)

(52) U.S. Cl.
   CPC .............. *H02K 5/10* (2013.01); *H02K 5/124* (2013.01); *H02K 5/1735* (2013.01); *H02K 7/14* (2013.01)

(58) Field of Classification Search
   CPC ........ H02K 5/10; H02K 5/124; H02K 5/1735; H02K 7/14
   USPC ....................................................... 310/66, 90
   See application file for complete search history.

(56) References Cited

U.S. PATENT DOCUMENTS

5,929,544 A * 7/1999 Maekawa ............... F04D 25/06
                                                          310/88

FOREIGN PATENT DOCUMENTS

| CN | 202068258 U | 12/2011 | |
| CN | 202153684 U | 2/2012 | |
| CN | 103126615 A | 6/2013 | |
| CN | 206364655 U | 7/2017 | |
| CN | 109687624 A | 4/2019 | |
| DE | 202018103767 * | 7/2018 | ............... H02K 7/14 |
| JP | H08326698 A | 12/1996 | |

* cited by examiner

*Primary Examiner* — Terrance L Kenerly
(74) *Attorney, Agent, or Firm* — Wayne IP LLC

(57) ABSTRACT

A non-contact overhead waterproof structure for high-speed motors includes a motor main body, a movable impeller, a fixed impeller, a motor shaft, a bearing and an oil seal layer. The movable impeller, the fixed impeller, the motor shaft and the bearing are provided inside the motor main body. The movable impeller, the fixed impeller and the bearing are sleeved on the motor shaft in sequence from top to bottom. The motor shaft is able to rotate along its axis to drive the movable impeller to rotate along the axis of the motor shaft. The fixed impeller is fixedly provided in the motor main body. The oil seal layer is provided between the movable impeller and the bearing, and is rotatably sleeved outside the motor shaft and sealedly provided between the motor shaft and the fixed impeller.

7 Claims, 2 Drawing Sheets

NON-CONTACT OVERHEAD WATERPROOF STRUCTURE FOR HIGH-SPEED MOTOR

CROSS-REFERENCE TO RELATED APPLICATIONS

This application is a continuation of International Patent Application No. PCT/CN2019/119669, filed on Nov. 20, 2019, which claims the benefit of priority from Chinese patent application Nos. 201811585697.8 and 201822177986.6, both filed on Dec. 24, 2018. The content of the aforementioned applications, including any intervening amendments thereto, is incorporated herein by reference.

TECHNICAL FIELD

This application relates to a waterproof structure for motors, and more particularly to a non-contact overhead waterproof structure for a high-speed motor.

BACKGROUND

Currently, the commercially-available motors generally adopt a conventional waterproof structure, which relies on waterproof performance of a bearing for waterproofing. However, in view of the high rotation speed of the motor, it fails to provide an effective waterproof effect only by processing the gap between inside and outside of the bearing to be small. Specifically, pressurized water or water-containing air can pass through the gap and enter the inside of the bearing, which will cause the bearing to be prone to corrosion and damage, thereby increasing the cost of production.

SUMMARY

An object of this application is to provide a non-contact overhead waterproof structure for a high motor to overcome the defects in the prior art, which has desired waterproof performance and stable operation.

Technical solutions of this application are described as follows.

This application provides a non-contact overhead waterproof structure for a high-speed motor, comprising:
  a motor main body;
  a movable impeller;
  a fixed impeller;
  a motor shaft;
  a bearing; and
  an oil seal layer;
wherein the movable impeller, the fixed impeller, the motor shaft and the bearing is provided inside the motor main body; the movable impeller, the fixed impeller and the bearing are sleeved on the motor shaft in sequence from top to bottom; the motor shaft is configured to rotate around an axis thereof to drive the movable impeller to rotate along the axis of the motor shaft; the fixed impeller is fixedly provided in the motor main body; the oil seal layer is provided between the movable impeller and the bearing; and the oil seal layer is rotatably sleeved outside the motor shaft and is sealedly provided between the motor shaft and the fixed impeller.

In an embodiment, the non-contact overhead waterproof structure further comprises a rotating bushing;
  wherein the rotating bushing is fixedly sleeved on the motor shaft, and is provided between the bearing and the oil seal layer; and the rotating bushing is rotatably matched with the oil seal layer.

In an embodiment, an overhead layer is provided between the rotating bushing and the fixed impeller; a drainage device is provided on a side of the oil seal layer facing the bearing; the drainage device is communicated with the overhead layer; and the drainage device is configured to drain water entering the overhead layer.

In an embodiment, the drainage device comprises a drainage groove and a storage tank; the drainage groove and the storage tank are both provided on the side of the oil seal layer facing the bearing; the drainage device is communicated with the overhead layer; and the drainage device is configured to drain the water entering the overhead layer into the storage tank for storage.

In an embodiment, the drainage device further comprises a fixing assembly; and the storage tank is configured to be detachably accommodated and fixed in the fixing assembly.

In an embodiment, the fixing assembly is provided with an accommodating cavity; and the storage tank is configured to be moved into or out of the accommodating cavity.

In an embodiment, a limit groove is provided on a side of the oil seal layer facing the rotating bushing; a limit block is provided on a side of the rotating bushing facing the oil seal layer; and the limit block is rotatably provided in the limit groove.

In an embodiment, a filter net is provided on a lower end of the limit groove; the filter net is provided with an insertion hole; the limit block extends into the limit groove through the insertion hole; and the limit block is rotatably matched with the insertion hole and the limit groove.

In an embodiment, two sides of the motor main body are respectively provided with a fan cover air outlet; and the fan cover air outlet is configured to discharge air in the motor main body.

In an embodiment, a waterproof seal gasket is sleeved outside the bearing.

Compared to the prior art, this disclosure has the following beneficial effects.

With respect to the non-contact overhead waterproof structure provided herein for high-speed motors, an oil seal layer is rotatably sheathed at an outer circumference of a motor shaft, and the oil seal layer is sealedly provided between the motor shaft and a fixed impeller. The oil seal layer is made of a wear-resistant material, such that the oil seal layer can keep pivoting friction with the motor shaft for a long time without being worn, so as to achieve the good seal performance. In addition, the oil seal layer is able to prevent water from entering a side of the oil seal layer facing a bearing from a side of the oil seal layer facing a movable impeller, so as to prevent the bearing inside a motor main body from contacting with water, avoiding rustiness.

BRIEF DESCRIPTION OF THE DRAWINGS

This disclosure will be described below with reference to the accompanying drawings to make the technical solutions of the present disclosure clearer. It is apparent that presented in the drawings are only some embodiments of the present disclosure. Those of ordinary skill in the art can also obtain other drawings based on these drawings without paying any creative efforts.

In these drawings: 1, motor main body; 11, motor shaft; 2, movable impeller; 3, fixed impeller; 4, bearing; 41, waterproof seal gasket; 5, fan cover air outlet; 6, oil seal layer; 61, oil seal portion; 62, oil seal base; 63, limit groove; 64, filter net; 641, insertion hole; 7, rotating bushing; 71, limit block; 8, overhead layer; 9, drainage device; 91, drainage groove; 92, storage tank; 921, sliding groove; 922, handle; 93, fixing assembly; 931, accommodating cavity; and 932, guide block.

DETAILED DESCRIPTION OF EMBODIMENTS

The present disclosure will be further described in detail with reference to the embodiments.

Figure 1:
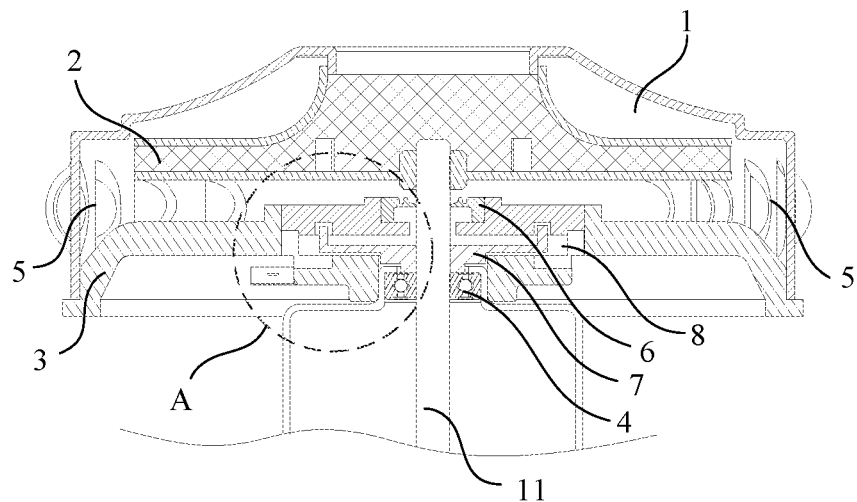
FIG. 1 is a schematic diagram of a non-contact overhead waterproof structure for a high-speed motor according to an embodiment of the present disclosure.

Referring to an embodiment shown in FIG. 1, this application provides a non-contact overhead waterproof structure for a high-speed motor, which has desired waterproof performance and stable operation, and can effectively block water from entering inside of a bearing. The non-contact overhead waterproof structure includes a motor main body 1, a movable impeller 2, a fixed impeller 3, a motor shaft 11, a bearing 4 and an oil seal layer 6. The movable impeller 2, the fixed impeller 3, the motor shaft 11 and the bearing 4 is provided inside the motor main body 1. The movable impeller 2, the fixed impeller 3 and the bearing 4 are sleeved on the motor shaft 11 in sequence from top to bottom. The motor shaft 11 is configured to rotate around an axis thereof to drive the movable impeller 2 to rotate along the axis of the motor shaft 11. The fixed impeller 3 is fixedly provided in the motor main body 1. The bearing 4 is configured to support the motor shaft 11 in a radial direction of the motor shaft 11 and reduce frictional resistance during rotation of the motor shaft 11 along the axis thereof, so as to ensure rotation accuracy.

The oil seal layer 6 is provided between the movable impeller 2 and the bearing 4. The oil seal layer 6 is rotatably sleeved outside the motor shaft 11 and is sealedly provided between the motor shaft 11 and the fixed impeller 3, such that water is prevented from entering a side of the oil seal layer 6 facing the bearing 4 from a side of the oil seal layer 6 facing the movable impeller 2, so as to prevent the bearing 4 inside the motor main body 1 from contacting with water, avoiding rustiness. Specifically, the motor shaft 11 is rotatably matched with the oil seal layer 6 and the oil seal layer 6 is in interference fit with the fixed impeller 3, so that a sealing structure is formed between the motor shaft 11 and the fixed impeller 3.

In this embodiment, the oil seal layer 6 is sleeved at an outer circumference of the motor shaft 11 and the oil seal layer 6 is sealedly provided between the motor shaft 11 and the fixed impeller 3. The oil seal layer 6 is made of a wear-resistant material, such that the oil seal layer 6 can keep pivoting friction with the motor shaft 11 for a long time without being worn, so as to achieve the good seal performance. In addition, the oil seal layer 6 is able to prevent water from entering the side of the oil seal layer 6 facing the bearing 4 from the side of the oil seal layer 6 facing the movable impeller 2, so as to prevent the bearing inside the motor main body 1 from contacting with water, avoiding rustiness.

In this embodiment, the oil seal layer 6 includes an oil seal portion 61 and an oil seal base 62. The oil seal portion 61 is rotatably sleeved on the motor shaft 11. The oil seal base 62 is sealedly provided between the oil seal portion 61 and the fixed impeller 3. Specifically, the motor shaft 11 is rotatably matched with the oil seal portion 61. The oil seal base 62 is configured to support the oil seal portion 61 and is in interference fit with the fixed impeller 3, such that the sealing structure is formed between the motor shaft 11 and the fixed impeller 3. Specifically, the oil seal portion 61 is made of a wear-resistant material.

In this embodiment, two sides of the motor main body are respectively provided with a fan cover air outlet 5. The fan cover air outlet 5 is configured to discharge air in the motor main body 1, avoiding corrosion of the bearing 4 by dirt in the air.

In this embodiment, the movable impeller 2 is a centrifugal impeller. During the high-speed rotation of the movable impeller 2, the air entering the motor main body 1 is removed, so that a negative pressure is formed in a space where the movable impeller 2 is located. At the same time, the air is discharged from the fan cover air outlet 5, so that a positive pressure is formed in a space under the oil seal layer 6, that is, the positive pressure is formed in the space where the bearing 4 is located. In this way, a pressure difference is formed between the space where the movable impeller 2 is located and the space where the bearing 4 is located, that is, the pressure difference is formed between the side of the oil seal layer 6 facing the movable impeller 2 and the side of the oil seal layer 6 facing the bearing 4. The water fails to flow into the space where the bearing 4 is located from the space where the movable impeller 2 is located under an action of the pressure difference, which effectively prevents the water from entering the side of the oil seal layer 6 facing the bearing 4 from the side of the oil seal layer 6 facing the movable impeller 2. In this way, the bearing 4 provided inside the motor main body 1 can be protected from being corroded by the water, so as to extend the service life.

Figure 2:
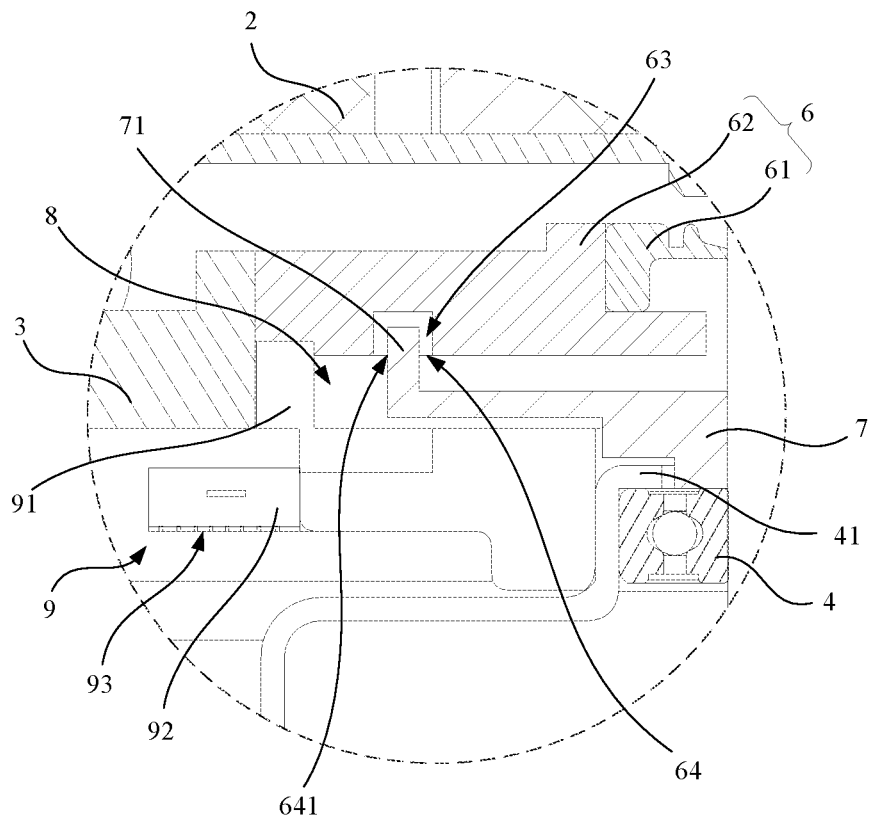
FIG. 2 is an enlarged view of part A shown in FIG. 1.

As shown in FIGS. 1-2, the non-contact overhead waterproof structure further includes a rotating bushing 7, which is fixedly sleeved on the motor shaft 11 and is provided between the bearing 4 and the oil seal layer 6. The rotating bushing 7 is rotatably matched with the oil seal layer 6.

Specifically, even if a small amount of water penetrates the oil seal layer 6 and enters the side of the oil seal layer 6 facing the bearing 4, the water will first fall on the rotating bushing 7, and then removed under the action of the centrifugal force generated by rotation of the rotating bushing 7 along with the motor shaft 11 along the axis of the motor drive shaft 11, thereby protecting the bearing 4 from being rusted by water.

The rotating bushing 7 is in an interference fit with the motor shaft 11 to prevent the small amount of water entering the side of the oil seal layer 6 facing the bearing 4 from passing through a gap between the rotating bushing 7 and the motor shaft 11 and rusting the bearing 4, so as to further play a role in waterproofing.

As shown in FIGS. 1-2, an overhead layer 8 is provided between the rotating bushing 7 and the fixed impeller 3. A drainage device 9 is provided on the side of the oil seal layer 6 facing the bearing 4. The drainage device 9 is communicated with the overhead layer 8. The drainage device 9 is configured to drain water entering the overhead layer 8. Specifically, the water removed under an action of the centrifugal force generated by the rotation of the rotating bushing 7 flows into the overhead layer 8 and then is discharged by the drainage device 9. Specifically, a space where the overhead layer 8 is located and a space where the bearing 4 is located both have a positive pressure, and the pressures in the two spaces are equal, so as to prevent the water in the overhead layer 8 from flowing to the bearing 4 due to the pressure difference and rusting the bearing 4.

Figure 3:
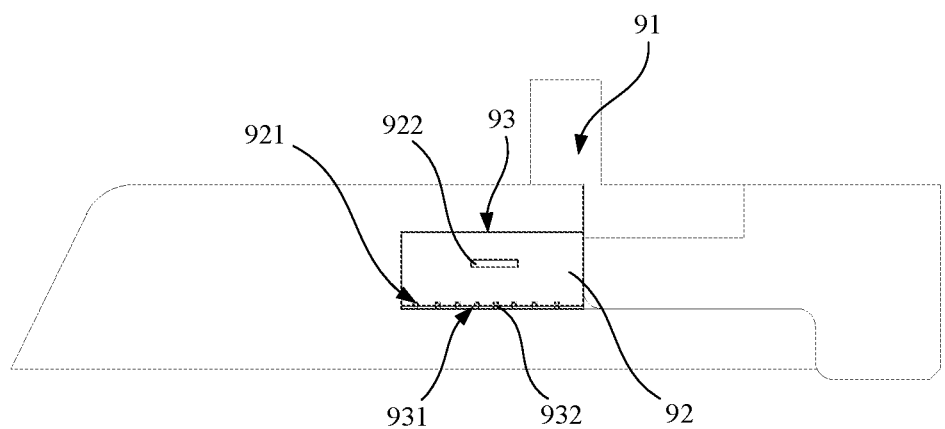
FIG. 3 is a schematic diagram of a drainage device in the non-contact overhead waterproof structure according to an embodiment of the present disclosure.

As shown in FIGS. 2-3, the drainage device 9 includes a drainage groove 91 and a storage tank 92. The drainage groove 91 and the storage tank 92 are both provided on the side of the oil seal layer 6 facing the bearing 4. The drainage device 9 is communicated with the overhead layer 8. The drainage device 9 is configured to drain water entering the overhead layer 8 into the storage tank 92 for storage. Specifically, the storage tank 92 is detachably provided on the side of the oil seal layer 6 facing the bearing 4. The water discharged from the drainage device 9 is absorbed by the storage tank 92. When the storage tank 92 is about to be filled with water, it is pulled out to pour the water and then put back again. Such design makes it simple to replace the storage tank 92, thereby enabling the motor main body 1 to work for a long time. The non-contact overhead waterproof structure provided herein has a simple structure and convenient operation.

As shown in FIG. 3, the drainage device further includes a fixing assembly 93 of the storage tank 92. The fixing assembly 93 is provided on the side of the oil seal layer 6 facing the bearing 4. The storage tank 92 is configured to be detachably accommodated and fixed in the fixing assembly 93. Specifically, the fixing assembly 93 is provided with an accommodating cavity 931. The storage tank 92 is configured to be moved into or out of the accommodating cavity 931.

A sliding groove 921 is provided on a bottom of the storage tank 92, and a guide block 932 matching with the sliding groove 921 is provided on a bottom wall of the accommodating cavity 931 to guide the storage tank 92 to be pulled out through the sliding groove 921. Specifically, when the storage tank 92 is about to be filled with water, it is pulled out by means of the sliding fit between the sliding groove 921 and the guide block 932 to pour the water, and then the storage tank 92 is put back again.

As shown in FIG. 3, a handle 922 is provided on a front end of the storage tank 92. The handle 922 is configured to facilitate the pull-out of the storage tank 92 from the fixing assembly 93, allowing for more simple and convenient operation.

As shown in FIG. 2, a limit groove 63 is provided on a side of the oil seal layer 6 facing the rotating bushing 7. A limit block 71 is provided on a side of the rotating bushing 7 facing the oil seal layer 6. The limit block 71 is rotatably provided in the limit groove 63. The limit block 71 is limited in the limit groove 63, so that a position of the rotating bushing 7 relative to the oil seal layer 6 in an axial direction of the motor shaft 11 is fixed and unchanged. Therefore, the rotating bushing 7 will not deviate when it is subjected to vibration generated by the motor main body 1, thereby ensuring the stable operation.

The limit block 71 is an annular limit block. The annular limit block is provided around the axial direction of the motor shaft 11. The limit groove 63 is an annular limit groove adapted to a shape of the limit block 71. The annular limit groove is also provided around the axial direction of the motor shaft 11.

As shown in FIG. 2, a filter net 64 is provided on a lower end of the limit groove 63. The filter net 64 is provided with an insertion hole 641. A small amount of the dirt in the air penetrates the oil seal layer 6 and enters the side of the oil seal layer 6 facing the rotating bushing 7. The filter net 64 is configured to prevent the small amount of the dirt from directly entering the space where the bearing 4 is located through the limit groove 63 and polluting the bearing 4. The limit block 71 of the rotating bushing 7 extends into the limit groove 63 through the insertion hole 641, and the limit block 71 is rotatably matched with the insertion hole 641 and the limit groove 63, such that the insertion hole 641 is configured to position the limit block 71. Specifically, the insertion hole 641 is an annular through hole adapted to the size and shape of the limit block 71, and the annular through hole is provided through the axial direction of the motor shaft 11. In actual operation, the limit block 71 is provided on the rotating bushing 7 and is rotatably matched with the limit groove 63 provided on the oil seal layer 6, so that the position of the rotating bushing 7 relative to the oil seal layer 6 in the axial direction of the motor shaft 11 is fixed and unchanged, thereby ensuring the rotating bushing 7 effectively performs a waterproof work. In addition, the rotating bushing 7 synchronously rotates with the motor shaft 11 and has strong centrifugal force. The small amount of the water on the rotating bushing 7 is removed under the action of the centrifugal force and then enters the overhead layer 8 and is discharged, which further enhances the waterproof performance.

As shown in FIG. 2, a waterproof seal gasket 41 is provided outside the bearing 4. The waterproof seal gasket 41 is configured to further prevent the water from entering the inside of the bearing 4 and ensure a stable working state of the inside of the bearing 4.

In actual operation, only a small amount of water may penetrate the oil seal layer 6 and enter the side of the oil seal layer 6 facing the bearing 4. The water first falls on the rotating bushing 7, and then removed by the rotating bushing 7 under the action of the centrifugal force generated by rotation of the rotating bushing 7 along with the motor shaft 11 along the axis of the motor drive shaft 11 and then flows into the overhead layer 8 through a gap between the limit groove 63 and the limit block 71 and then is discharged into the storage tank 92 through the drainage groove 91. The discharged water is finally stored in the storage tank 92 to avoid affecting other components. In addition, the storage tank 92 can be quickly pulled out to remove the water therein by means of the matching between the sliding groove 921 and the guide block 932, simplifying the operation and achieving the long-time work.

In addition, most of the air flowing into the motor main body 1 is directly discharged from the fan cover air outlet 5 through the movable impeller 2, and only a small part of the air can penetrate the oil seal layer 6 and enter the side of the oil seal layer 6 facing the bearing 4. The air penetrating the oil seal layer 6 will also be removed under the action of the centrifugal force generated by the rotation of the rotating bushing 7 along with the motor shaft 11 around the axis of the motor shaft 11, and then flow into the overhead layer 8 through the gap between the limit groove 63 and the limit block 71 to be discharged through the drainage groove 91.

The above description is intended to enable those skilled in the prior art to implement and use the invention, and should not be construed as limitation to this application. It should be understood that any modifications, changes and replacements made by those skilled in the art without departing from the spirit of the disclosure should still fall within the scope of the disclosure defined by the appended claims.

What is claimed is:

1. A non-contact overhead waterproof structure for a high-speed motor, comprising:
   a motor main body;
   a movable impeller;
   a fixed impeller;
   a motor shaft;
   a bearing; and an oil seal layer;

a rotating bushing;

wherein the movable impeller, the fixed impeller, the motor shaft and the bearing is provided inside the motor main body; the movable impeller, the fixed impeller and the bearing are sleeved on the motor shaft in sequence from top to bottom; the motor shaft is configured to rotate around an axis thereof to drive the movable impeller to rotate along the axis of the motor shaft the fixed impeller is fixedly provided in the motor main body; the oil seal layer is provided between the movable impeller and the bearing; and the oil seal layer is rotatably sleeved outside the motor shaft and is sealedly provided between the motor shaft and the fixed impeller;

the rotating bushing is fixedly sleeved on the motor shaft, and is provided between the bearing and the oil seal layer; and the rotating bushing is rotatably matched with the oil seal layer;

an overhead layer is provided between the rotating bushing and the fixed impeller; a drainage device is provided on a side of the oil seal layer facing the bearing; the drainage device is communicated with the overhead layer; and the drainage device is configured to drain water entering the overhead layer;

the drainage device comprises a drainage groove and a storage tank; the drainage groove and the storage tank are both provided on the side of the oil seal layer facing the bearing; the drainage device is communicated with the overhead layer; and the drainage device is configured to drain the water entering the overhead layer into the storage tank for storage; and the drainage device further comprises a fixing assembly; and the storage tank is configured to be detachably accommodated and fixed in the fixing assembly.

2. The non-contact overhead waterproof structure of claim 1, wherein the fixing assembly is provided with an accommodating cavity; and the storage tank is configured to be moved into or out of the accommodating cavity.

3. The non-contact overhead waterproof structure of claim 1, wherein two sides of the motor main body are respectively provided with a fan cover air outlet; and the fan cover air outlet is configured to discharge air in the motor main body.

4. The non-contact overhead waterproof structure of claim 1, wherein a waterproof seal gasket is sleeved outside the bearing.

5. A non-contact overhead waterproof structure for a high-speed motor, comprising:

a motor main body;

a movable impeller;

a fixed impeller;

a motor shaft;

a bearing; and an oil seal layer;

a rotating bushing;

wherein the movable impeller, the fixed impeller, the motor shaft and the bearing is provided inside the motor main body; the movable impeller, the fixed impeller and the bearing are sleeved on the motor shaft in sequence from top to bottom; the motor shaft is configured to rotate around an axis thereof to drive the movable impeller to rotate along the axis of the motor shaft the fixed impeller is fixedly provided in the motor main body; the oil seal layer is provided between the movable impeller and the bearing; and the oil seal layer is rotatably sleeved outside the motor shaft and is sealedly provided between the motor shaft and the fixed impeller;

the rotating bushing is fixedly sleeved on the motor shaft, and is provided between the bearing and the oil seal layer; and the rotating bushing is rotatably matched with the oil seal layer;

a limit groove is provided on a side of the oil seal layer facing the rotating bushing; a limit block is provided on a side of the rotating bushing facing the oil seal layer; and the limit block is rotatably provided in the limit groove; and a filter net is provided on a lower end of the limit groove; the filter net is provided with an insertion hole; the limit block extends into the limit groove through the insertion hole; and the limit block is rotatably matched with the insertion hole and the limit groove.

6. The non-contact overhead waterproof structure of claim 5, wherein two sides of the motor main body are respectively provided with a fan cover air outlet; and the fan cover air outlet is configured to discharge air in the motor main body.

7. The non-contact overhead waterproof structure of claim 5, wherein a waterproof seal gasket is sleeved outside the bearing.

* * * * *